United States Patent Office 2,693,425
Patented Nov. 2, 1954

2,693,425
ASPHALT CEMENT OF IMPROVED WETTING PROPERTIES

Harley F. Hardman, Lyndhurst, Ohio, assignor to The Standard Oil Company, Cleveland, Ohio, a corporation of Ohio Application April 14, 1952, Serial No. 282,270

The portion of the term of the patent subsequent to April 15, 1969, has been disclaimed or dedicated to the public

10 Claims. (Cl. 106—273)

The present invention relates to an asphalt-containing composition of improved wetting properties. More particularly, the invention relates to an asphalt mixture comprising asphalt cement suitable for roads in conjunction with an additive capable of imparting improved wetting properties to the asphalt, said additive consisting of an acidic organic phosphorus compound containing pentavalent phosphorus and an acid hydrogen atom.

This application is a continuation-in-part of U. S. patent application Serial No. 28,729, filed May 22, 1948, now U.S. Patent No. 2,592,564, dated April 15, 1952.

Some asphalts have good covering properties with respect to sand, rock, or other construction materials. However, when the solid aggregate becomes wet, either before or after coating, it often is impossible to obtain or retain a satisfactory bond between the asphalt and the stony material or other aggregate.

It is obvious that a good bonding property of the asphalt is of primary importance, and that this property has to be independent of the dry or moist state of the material to be covered as well as of the prevailing weather.

It is, therefore, an object of the present invention to improve the bonding properties of asphalt and similar bituminous material by adding thereto an agent which will impart to the asphalt the necessary bonding capacity at all times and under all conditions. The invention is particularly adapted for use with asphalt cement from petroleum sources. Asphalt cement is usually a viscous, plastic material that is solid appearing at ordinary temperatures. It is usually applied to a surface to be coated after the asphalt has been heated to soften it or liquefy it.

The term "asphalt cement" is applied to an asphalt suitable for direct use in highway and other paving work. Asphalt cement is generally produced by oxidizing petroleum residuums or by bringing natural asphalts to a desired consistency by heating or by mixing or fluxing with a harder or softer asphalt. Asphalt cement is to be distinguished from "cut back" asphalt which contains a volatile solvent, and asphalt emulsions which are asphalt emulsified with water.

Asphaltic pavements deteriorate badly whenever the penetration of the asphalt (measured at 77° F.) drops below about 25, as is shown by numerous references to the literature. Penetration is related generally to melting point, i. e., asphalts with a low penetration have a high melting point.

The paving asphalt compositions of the present invention have softening (melting) points of less than 140° F. and penetrations not below 25. Such asphalts are essential in the construction of highway pavings, in order that the highway will stand up. Such asphalts are to be distinguished from higher melting (softening point) asphalts which are used as coatings.

In paving asphalts, flexibility is required and flexible asphalts have relatively high penetrations and relatively low softening points. However, high flexibility increases the difficulty of maintaining the adherence of the asphalt to stone aggregate.

On roofs, pipes, and in other similar applications of high melting point asphalts, stresses tending to separate the asphalt from the surface to which it is applied generally are relatively small, hence there is no need for the incorporation of an anti-stripping additive in the asphalt composition.

Generally speaking, higher softening point asphalt adheres well to any surface and does not present a serious stripping problem. However, these high melting materials have a low penetration and break up under impact and cannot be used in roads. Thus, the softer materials above described which are essential to the prevention of breaking up of highway pavings present the stripping problem which the present invention solves.

Below is a table showing the softening points of typical paving asphalt compositions prepared in accordance with the invention. The asphalts are classified by their respective penetration ranges.

| Designation | Penetration at 77° F. (100 g.—5 sec.) | Softening point, ° F. |
|---|---|---|
| Ohio Highway Department asphalt cement specifications | 200–300 | 90–125 |
|  | 150–200 | 95–131 |
|  | 85–100 | 104–140 |
|  | 70–80 | 104–140 |
|  | 60–70 | 104–140 |
| Paving asphalts prepared in accordance with the invention | 200–220 | 90–105 |
|  | 120–150 | 105–110 |
|  | 85–100 | 110–120 |
|  | 70–80 |  |
|  | 60–70 | 115–130 |
|  | 50–60 | 120–135 |

It has been found, in accordance with the invention, that asphalt cements having good adhesion to wet aggregate can be prepared by incorporating therewith an acidic organic phosphorus compound having a pentavalent phosphorus atom, of which two valences are taken with an oxy oxygen atom, one or two valences are taken with an organic radical of from 2 to about 24 carbon atoms and preferably having 10 or more carbon atoms, linked to the phosphorus atom through an ether oxygen atom, and one or two valences taken with a hydroxyl group having an acid hydrogen atom, i. e., a hydrogen atom linked to the phosphorus atom through an oxygen atom.

These are old compounds, recognized by those skilled in the art as primary and secondary organic acid esters of phosphorus acids, and have the following general structure:

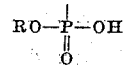

in which RO is a saturated or unsaturated organic radical linked to the phosphorus atom through an ether oxygen, such as alkyloxy, aryloxy, acyloxy, araloxy, alkaryloxy, esteroxy, etc.

The free valence of phosphorus may be taken with a variety of groups, and thus there are several types of phosphorus compounds within the general formula. For example, the free valence of the phosphorus atom may be taken with a second hydroxyl group having an acid hydrogen atom:

 (1)

or with a second RO group:

 (2)

or with an

group:

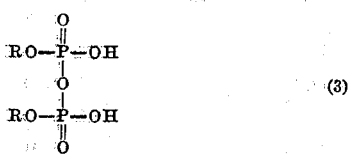 (3)

or with an

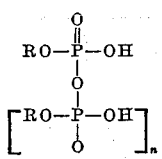

group:

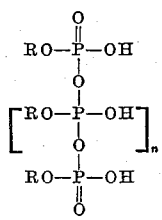

where n is a whole number, i. e., 1 in triphosphoric acid derivatives, 2 in tetraphosphoric acid derivatives and higher numbers in higher polyphosphoric acid derivatives.

These compounds may be regarded as derivatives of a phosphorus acid which possesses a hydroxy group, such as ortho- and pyrophosphoric acid, and the higher polyacids of pentavalent phosphorus, and of a hydroxy organic compound capable of reacting with a phosphorus acid such as an aliphatic alcohol, a phenol, an alkyl halide, an alkaryl halide, an aralkyl halide, a hydroxy or halogen acid, a hydroxy or halogen ester, more particularly a partial ester of a glycol or glycerol, i. e., an ester in which not all the hydroxy groups of the glycol or glycerol have been esterified, etc.

Asphalt compositions comprising certain organic derivatives of phosphorus acids which do not have an acid hydrogen atom, such as neutral tertiary organic phosphates or neutralized primary and secondary organic acid phosphates, have poor wetting properties and low adhesion to wet stone. An acid hydrogen atom is therefore an essential feature of the phosphorus compounds employed in the compositions of the invention. However, phosphorus acid esters which do not initially possess but which acquire an acid hydrogen atom by reaction are equivalent to the compounds contemplated for use in the compositions of the invention and are therefore intended to be within the scope thereof, for such additives become effective by reaction in the asphalt to improve its adhesion to wet aggregate.

It has been found, in accordance with the invention, that the addition of one of the above-mentioned acidic phosphorus compounds to asphalt will increase the adhesion of the asphalt to a wet or dry surface such as is reflected in its adherence to a wet aggregate from less than 20%, up to 90 to 100%. In many cases an increase up to 80% is considered satisfactory.

In preparing the compositions of the invention, the acidic phosphorus compound need only be uniformly mixed with the asphalt cement. It generally will be necessary to heat the asphalt to soften or liquefy it to such an extent that the organic phosphoric acid compound may be thoroughly mixed therewith. Asphalt is compatible with the acid phosphorus compound and on thorough admixture therewith remains as a homogeneous composition. If desired, any mutual solvent or other compound inducing mutual solubility may be added. The test employed in the testing of these materials represents extremely severe conditions.

One hundred grams of standard reference stone composed of fifty per cent silica gravel and fifty per cent crushed limestone, graded to pass a ⅜″ sieve and to be retained on a ¼″ sieve, was placed in an eight ounce seamless ointment box and heated in a constant temperature oven at 275° F. for not less than one-half hour. At the end of the treating period, five grams of asphalt cement containing an additive of the invention and heated to the same temperature was added and mixed vigorously with the aggregate, using a small spatula, for three minutes to make sure that each aggregate particle was completely coated. After coating the mixture was spread thinly on a glass plate and allowed to cool and cure at laboratory temperature for one hour.

The mixture was then placed in water heated to vigorous boiling and was maintained at this temperature for one-half hour after which time it was examined, the number of particles that showed stripping counted, and the percentage of particle which remained coated determined.

Using the above test, the following results were obtained with 70/80 pen. asphalt cement containing 1% by weight of the additives listed below:

| Compound | Formula | Percent coated |
|---|---|---|
| No additive | | 50 |
| Monoamyl dihydrogen phosphate and diamyl monohydrogen phosphate. | $C_5H_{11}O\diagdown_{\phantom{P}}\diagup OH$ and $C_5H_{11}O\diagdown_{\phantom{P}}\diagup OH$ ; $HO\diagup^{P}\diagdown O$   $C_5H_{11}O\diagup^{P}\diagdown O$ | 95 |
| Mono n-butyl dihydrogen phosphate and di-n-butyl monohydrogen phosphate. | $C_4H_9O\diagdown_{\phantom{P}}\diagup OH$ and $C_4H_9O\diagdown_{\phantom{P}}\diagup OH$ ; $HO\diagup^{P}\diagdown O$   $C_4H_9O\diagup^{P}\diagdown O$ | 88 |
| Mono n-propyl dihydrogen phosphate and di-n-propyl monohydrogen phosphate. | $C_3H_7O\diagdown_{\phantom{P}}\diagup OH$ and $C_3H_7O\diagdown_{\phantom{P}}\diagup OH$ ; $HO\diagup^{P}\diagdown O$   $C_3H_7O\diagup^{P}\diagdown O$ | 95 |
| Diethanol amino ethyl phosphatidic acid. | $H_2C-O-\overset{O}{\overset{\|}{C}}-C_{17}H_{33}$ $HC-O-\overset{OH}{\underset{\|}{\overset{\|}{P}}}-OC_2H_4N(C_2H_4OH)_2$  $H_2C-O-\overset{O}{\overset{\|}{C}}-C_{17}H_{33}$ | 90 |
| Monoethyl dihydrogen and diethyl hydrogen phosphate. | $C_2H_5O\diagdown_{\phantom{P}}\diagup OH$ and $C_2H_5O\diagdown_{\phantom{P}}\diagup OH$ ; $HO\diagup^{P}\diagdown O$   $C_2H_5O\diagup^{P}\diagdown O$ | 96 |
| Pyrophosphatidic acid. | $R'-O-\overset{O}{\overset{\|}{P}}-OH$ $R'-O-\overset{O}{\overset{\|}{P}}-OH$  where R′ is a radical of a diglyceride of a 10 to 18 carbon fatty acid | 95 |
| t-amyl phenol dihydrogen phosphate. | $C_2H_5-\overset{CH_3}{\underset{CH_3}{\overset{\|}{C}}}-\bigcirc-O-\overset{OH}{\underset{\|}{P}}=O$ | 92 |

The following results were obtained with fully esterified phosphoric acid esters which did not contain an acid hydrogen atom.

| Compound | Formula | Percent coated |
|---|---|---|
| Triphenyl phosphate | (triphenyl phosphate structure) | 25 |
| Tributyl phosphate | | 20 |
| Trioctyl phosphate | | 60 |
| Tricresyl phosphate | | 20 |
| Terpene-substituted phenol triphosphate. | | 25 |

The following result was obtained with a neutralized phosphoric acid ester:

| Compound | Percent coated |
|---|---|
| Sodium salt of pyro phosphatidic acid | 55 |

The best result obtainable was only a coating of 55%. This amount is far below the acceptable standard for highway paving.

In the above examples the amount of the acidic phosphorus compound in the asphalt is 1 or 2% in order to compare the results of different compounds. This amount may vary from 0.1% to more than 5%. However, asphalt is a low priced material and there is no point in using more of the phosphoric derivative than is necessary to secure the desired adherence of the asphalt to the aggregate. Generally the smallest amount will be used that will meet the particular requirements. In some cases, a fraction of one percent will give a marked improvement in adhesion.

As stated above, asphalts prepared according to the invention may be applied either to wet or dry aggregate. In some instances, asphalt applied to a dry surface adheres well but loses its adherence in the presence of water which tends to enter the interface between the asphalt and the surface. When the asphalts of the invention are used, even though applied dry they have greater resistance to "stripping" from the surface under wet conditions.

It is also to be understood that the formulas indicated above for the additive are merely illustrative and that many modifications in the radicals combined with the pentavalent phosphorus may be made without departing from the spirit of the invention.

I claim:

1. An asphalt composition consisting essentially of asphalt cement having a softening point within the range from about 90 to 140° F. and a penetration at 77° F. of from about 50 to about 220 and a small amount of an acidic organic phosphorus compound having a pentavalent phosphorus atom, of which two valences are taken with an oxy oxygen atom, from one to two valences are taken with an organic ether radical of from two to about 24 carbon atoms containing only carbon, hydrogen and oxygen and linked to the phosphorus atom through the oxy oxygen atom and the remaining valences taken with hydroxyl groups having an acid hydrogen atom, said compound being in an amount to improve the adhesion of the asphalt to wet stone.

2. An asphalt composition consisting essentially of asphalt cement having a softening point within the range from about 90 to 140° F. and a penetration at 77° F. of from about 50 to about 220 and a small amount of an acidic organic pentavalent phosphorus acid derivative, the phosphorus atom of which having two valences taken with an oxy oxygen atom, from one to two valences taken with an organic ether radical of from two to about 24 carbon atoms containing only carbon, hydrogen and oxygen and linked to the phosphorus atom through the oxy oxygen atom and the remaining valences taken with hydroxyl groups having an acid hydrogen atom, said compound being in an amount to improve the adhesion of the asphalt to wet stone.

3. An asphalt composition in accordance with claim 2 in which the phosphorus acid is an orthophosphoric acid.

4. An asphalt composition in accordance with claim 2 in which the phosphoric acid is a pyrophosphoric acid.

5. An asphalt composition consisting essentially of asphalt cement having a softening point within the range from about 90 to 140° F. and a penetration at 77° F. of from about 50 to about 220, and a small amount of an acidic organic phosphorus compound having the structure

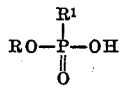

in which R is an organic radical having from two to 24 carbon atoms containing only carbon, hydrogen and oxygen and R¹ is selected from the group consisting of hydroxyl, and OR radical, an

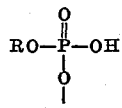

group, and a

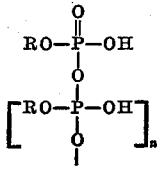

where $n$ is a whole number, said compound being in an amount to improve the adhesion of the asphalt to wet stone.

6. An asphalt composition consisting essentially of asphalt cement having a softening point within the range from about 90 to 140° F. and a penetration at 77° F. of from about 50 to about 220, and a small amount of an aliphatic ester of a phosphoric acid, selected from the group of ortho and pyrophosphoric acids, said aliphatic radical having at least 10 to about 24 carbon atoms containing only carbon, hydrogen and oxygen, said ester having an acid hydrogen atom and being in an amount to improve the adherence of the asphalt to wet stone.

7. An asphalt composition consisting essentially of asphalt cement having a softening point within the range from about 90 to 140° F. and a penetration at 77° F. of from about 50 to about 220, and a small amount of a mixed di-ester of a phosphoric acid, selected from the group of ortho- and pyrophosphoric acids, at least one of said ester radicals having at least 10 to about 24 carbon atoms and each of said radicals containing only carbon, hydrogen and oxygen, said ester having an acid hydrogen atom and being in an amout to improve the adherence of the asphalt to wet stone.

8. An asphalt composition consisting essentially of asphalt cement having a softening point within the range from about 90 to 140° F. and a penetration at 77° F. of from about 50 to about 220, and 0.1 to 5% of a compound of the general formula

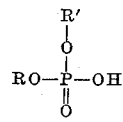

in which R is a radical selected from the group consisting of H and aliphatic radicals, and R' is an aliphatic radical, and at least one of them contains at least 10 to about 24 carbon atoms, and each of said radicals contains only carbon, hydrogen and oxygen.

9. An asphalt composition consisting essentially of asphalt cement having a softening point within the range from about 90 to 140° F. and a penetration at 77° F. of from about 50 to about 220, and 0.1 to 5% of a compound of the general formula

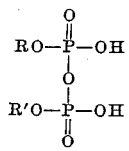

in which R is a radical selected from the group consisting of H and aliphatic radicals and R' is an aliphatic radical, and at least one of them contains at least 10 to about 24 carbon atoms, and each of said radicals contains only carbon, hydrogen and oxygen.

10. An asphalt composition of high wetting properties consisting essentially of asphalt cement having a softening point within the range from about 90 to 140° F. and a penetration at 77° F. of from about 50 to about 220, and about 2% of a pyrophosphate of the formula

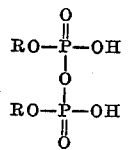

in which R is a diglyceride radical of a natural fat.

References Cited in the file of this patent

UNITED STATES PATENTS

| Number | Name | Date |
|---|---|---|
| 2,080,299 | Benning | May 11, 1937 |
| 2,191,295 | Dohse | Feb. 20, 1940 |
| 2,442,707 | Olson | June 1, 1948 |
| 2,592,564 | Hardman | Apr. 15, 1952 |